UNITED STATES PATENT OFFICE.

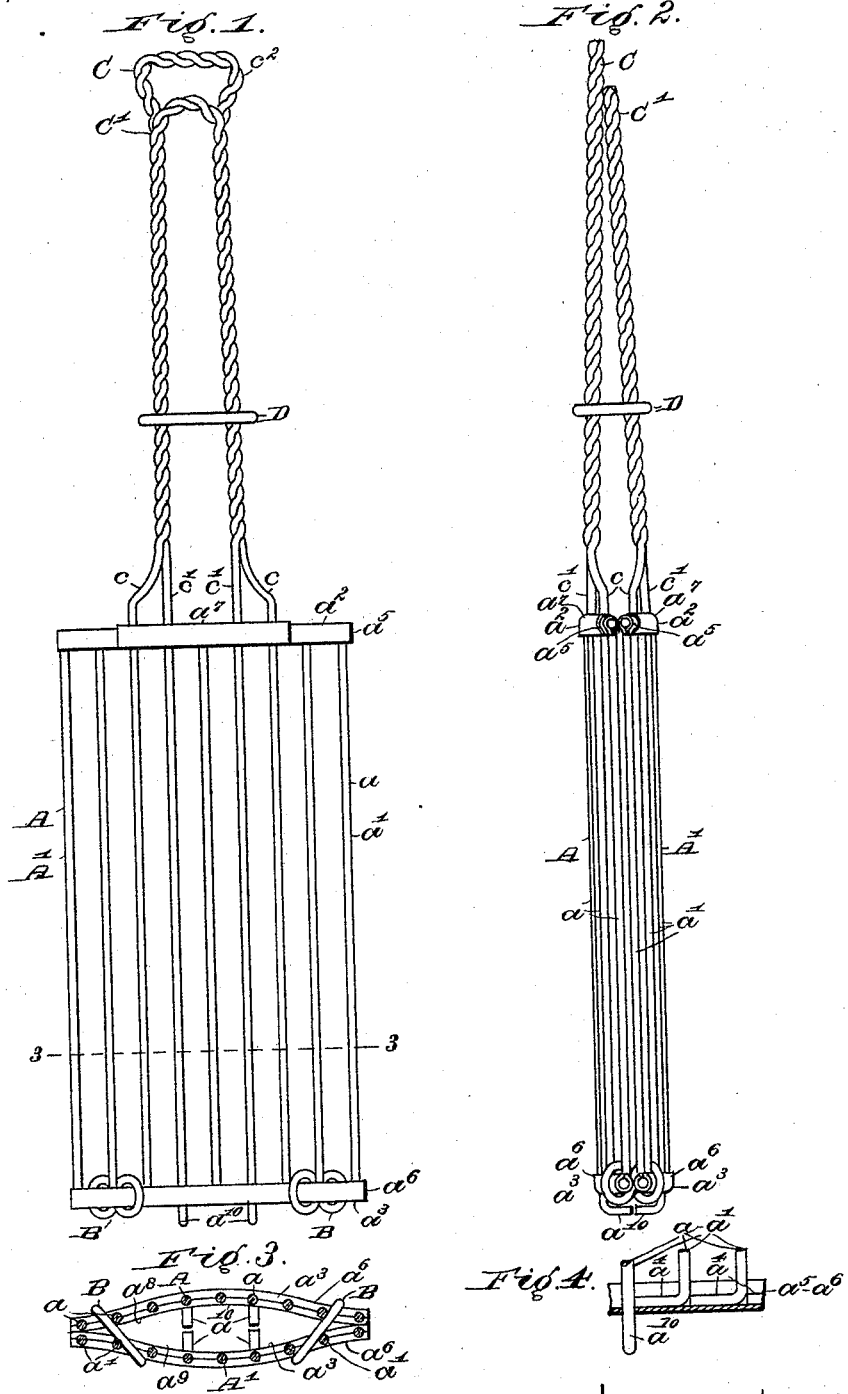

ANDREW J. DEVOLL, OF LOWELL, MASSACHUSETTS, ASSIGNOR TO EDWARD P. WOODS, OF SAME PLACE.

BROILER.

SPECIFICATION forming part of Letters Patent No. 585,432, dated June 29, 1897.

Application filed April 13, 1896. Serial No. 587,289. (No model.)

*To all whom it may concern:*

Be it known that I, ANDREW J. DEVOLL, a citizen of the United States, residing at Lowell, in the county of Middlesex and Commonwealth of Massachusetts, have invented a certain new and useful Improvement in Broilers, of which the following is a specification.

My invention relates to broilers, particularly broilers having two leaves hinged to each other at one end and having a handle at the other end; and it consists in the devices and combinations hereinafter described and claimed, the object of the same being more securely to retain the object to be broiled between the leaves of the broiler and to prevent such object from slipping out at the sides or end of the broiler.

In the accompanying drawings, Figure 1 is a plan of a broiler provided with my improvement; Fig. 2, a side elevation of the same; Fig. 3, a vertical transverse section of the same on the line 3 3 in Fig. 1, showing the lateral curvature of the leaves and the stops at the ends of the leaves; Fig. 4, a central section through the binder, showing the means of spacing the bars.

The drawings show a broiler made of wire. This broiler comprises two leaves A A', hinged to each other in any usual manner, as by links or double eyes B B. Each leaf A A' consists of parallel longitudinal bars $a$ $a'$, of wire, arranged at proper intervals from each other and united in a rigid frame by end bars $a^2$ $a^3$ in any usual manner.

In the drawings the bars $a$ $a'$ are represented in Fig. 4 as bent laterally at $a^4$ to secure the proper spaces between successive bars $a$ $a'$ and to stiffen the frame, said bars $a$ $a'$ being held from movement by binders $a^5$ $a^6$, of sheet metal, which is crimped over the bent spacing parts $a^4$ in the usual manner, four of said longitudinal bars in each leaf A A' being represented as of sufficient length to pass through the corresponding binders $a^5$ $a^6$ and as being made in two continuous pairs, the bars of each pair being connected by a handle-wire $c$ $c'$, there being for each leaf two such handle-wires twisted together to form the handle C C' of such leaf. The handles C C' are held together by a slide or loop D, which is retained on the handle C of one leaf A by an enlargement $c^2$ of the free end of said handle, and may be removed from the free end of the other handle when it is desired to open or spread apart the leaves.

The construction of the broiler as far as above described is not new or of my invention.

Usually the leaves A A' are flat, and there is nothing but the pressure of said leaves to prevent the food or thing being broiled from slipping out at the sides of the broiler or at the end thereof farthest from the handle. I remedy this defect by curving the leaves laterally, as shown, in such a manner that their adjacent faces $a^8$ $a^9$ are concave and the side edges of each leaf come in contact or nearly in contact with the side edges of the other leaf, as shown in Fig. 3, and by continuing one or more of the longitudinal bars $a$ $a'$ in each leaf through the binder $a^6$ farthest from the handle and bending them inward toward the other leaf, as best shown at $a^{10}$ in Figs. 2 and 3. By this means the contents of the broiler are prevented from falling out of the broiler and the broiler is adapted to hold securely articles which differ greatly in thickness.

It is desirable to use at the ends of each leaf nearest the handle a supplementary binder $a^7$ to strengthen the broiler against the tendency of the slide D to flatten the leaves by drawing the handles together when the broiler is exposed to heat, this binder being like the binders $a^5$ $a^6$ in principle and operation.

I claim as my invention—

A broiler, having hinged leaves, formed of parallel longitudinal bars and transverse end bars or binders, and having handles, said leaves being laterally curved to render the adjacent faces of said leaves concave, and some of said longitudinal bars in each leaf being continued through said binders and bent toward the other leaf to form stops, as and for the purpose specified.

In witness whereof I have signed this specification, in the presence of two attesting witnesses, this 24th day of March, A. D. 1896.

ANDREW J. DEVOLL.

Witnesses:
ALBERT M. MOORE,
GRACE E. HIBBERT.